United States Patent
Kajitani et al.

(10) Patent No.: US 9,969,338 B1
(45) Date of Patent: May 15, 2018

(54) INTERIOR COMPONENT

(71) Applicant: HOWA KASEI CO., LTD., Nagoya-Shi (JP)

(72) Inventors: Tsugiaki Kajitani, Nagoya (JP); Hidekazu Oike, Nagoya (JP)

(73) Assignee: Howa Kasei Co., Ltd., Nagoya-Shi (JP)

( * ) Notice: Subject to any disclaimer, the term of this patent is extended or adjusted under 35 U.S.C. 154(b) by 0 days. days.

(21) Appl. No.: 15/601,129

(22) Filed: May 22, 2017

(30) Foreign Application Priority Data

Mar. 8, 2017 (JP) ................................. 2017-043461
Mar. 21, 2017 (JP) ................................. 2017-054127

(51) Int. Cl.
    *B60R 7/00* (2006.01)
    *B60R 13/02* (2006.01)
    *B60R 11/00* (2006.01)

(52) U.S. Cl.
    CPC ...... *B60R 13/0262* (2013.01); *B60R 13/0275* (2013.01); *B60R 13/02* (2013.01); *B60R 2011/0007* (2013.01)

(58) Field of Classification Search
    CPC .. B60R 13/02; B60R 13/0275; B60R 13/0243
    USPC ............................................. 296/24.34, 37.8
    See application file for complete search history.

(56) References Cited

U.S. PATENT DOCUMENTS

| | | | | |
|---|---|---|---|---|
| 5,939,165 A | * | 8/1999 | Oike | B32B 27/08 264/46.5 |
| 6,827,895 B1 | * | 12/2004 | Yamamoto | B29C 45/14 264/266 |
| 8,262,968 B2 | * | 9/2012 | Smith | B29C 45/1639 264/254 |
| 8,505,997 B2 | * | 8/2013 | Hipshier | B60N 2/4686 29/91.1 |
| 9,505,356 B2 | * | 11/2016 | Migaki | B60R 13/0237 |
| 2012/0034467 A1 | * | 2/2012 | Nagasaka | C08F 212/12 428/412 |

FOREIGN PATENT DOCUMENTS

JP  5607375 B2  10/2014

* cited by examiner

*Primary Examiner* — Pinel E Romain
(74) *Attorney, Agent, or Firm* — Burr & Brown, PLLC

(57) ABSTRACT

The interior component of the invention has a core material and a skin material arranged to cover a surface of the core material. The core material is provided with a top plate, an outer wall portion having a round shape at a corner portion, and a plurality of drop-off prevention ribs arranged adjacent to the outer wall portion. A resin band is mounted to an inner surface of a peripheral edge portion of the skin material. The resin band and the peripheral portion of the skin material are fitted and fixed to the outer wall portion of the core material by using reaction force generated when the resin band is elastically folded into the corner portion.

5 Claims, 6 Drawing Sheets

"PRIOR ART"

INTERIOR COMPONENT

BACKGROUND

1. Technical Field

The present invention relates to an interior component in which a skin material is arranged to cover a surface of a core material.

2. Related Art

Generally, an interior component such as a lid body of a console box for a vehicle has a structure in which a skin material is arranged to cover a surface of a core material. The core material is provided with a top plate made of resin and an outer wall portion extended downward from a circumference of the top plate, and the skin material sewn into a bag shape is arranged to cover the core material from a side of the top plate and a peripheral edge portion of the skin material is folded toward an inner side of the outer wall portion and fixed to the core material. Further, the skin material having a urethane foam layer arranged on a rear surface of a skin layer is widely used.

In such fixation, a metal tacker is usually used. However, fixing the skin material at a corner part of the core material uniformly without generating wrinkles by using the tacker requires a specific skill. Further, when the tacker is erroneously driven, a distal end of the tacker might be protruded toward a side of the skin material.

Thus, JP 5607375 B discloses that, as shown in FIG. 9, a protrusion 3 is formed on an inner side surface of an outer wall portion 2 of a core material 1 and a skin material 4 is fixed by inserting the protrusion 3 into an engagement hole 5 formed at a peripheral edge portion of the skin material 4. However, if the protrusion 3 is formed on the inner side surface of the outer wall portion 2 of the core material 1 in a vertical direction against the outer wall portion 2, the core material 1 as it is cannot be released from a molding die. Thus, a structure of the molding die for the core material 1 becomes complicated, and therefore a cost of the molding die is increased. Further, since it is necessary to form many engagement holes 5 at the peripheral edge portion of the skin material 4, a manufacturing cost of the skin material 4 is also increased.

Besides, fixing the peripheral edge portion of the skin material to the inner surface of the outer wall portion by an adhesive is also adopted; however drying the adhesive requires much time and it is likely that the adhesive is melted when temperature of an inside of a vehicle becomes high, and therefore durability might not be sufficient.

SUMMARY

Accordingly, an object of the present invention is to provide an interior component in which a peripheral edge portion of a skin material is firmly fixed on inner side surface of an outer wall portion of a core material in order to solve the conventional problem described above without using a tacker or forming a protrusion at the inner surface of the outer wall portion.

The present invention completed to solve the problem described above is an interior component in which a skin material is arranged to cover a surface of a core material. The core material is provided with a top plate and an outer wall portion having an R-shape at a corner portion. A resin band is mounted to an inner surface of a peripheral edge portion of the skin material, and the resin band and the peripheral edge portion are fitted to the outer wall portion of the core material by using reaction force generated when the resin band is elastically folded into the corner portion at an inner side of the outer wall portion.

Further, it is preferable that the resin band is formed by a resin core material having a constant width and mounted continuously to the inner surface of the peripheral edge portion including the corner portion of the skin material. Further, the core material can be provided with a plurality of drop-off prevention ribs arranged adjacent to the outer wall portion. Further, a stopper wall with which an end portion of the resin band is contacted can be arranged on the inner surface of the outer wall portion of the core material.

The interior component according to the present invention has a structure in which the resin band mounted to the inner surface of the peripheral edge portion of the skin material is elastically folded into the corner portion having the R-shape at the inner side of the outer wall portion of the core material and the resin band and the peripheral edge portion of the skin material are fitted to the outer wall portion of the core material by using the reaction force generated by the folding of the resin band. Further, relating to a straight part in the outer wall portion of the core material, the peripheral edge portion of the skin material can be fixed to the outer wall portion of the core material by inserting the resin band and the peripheral edge portion of the skin material into a gap between the outer wall portion and the drop-off prevention rib. In this way, since the peripheral edge portion of the skin material is fitted to the outer wall portion of the core material by elasticity of the resin band, the peripheral edge portion of the skin material can be firmly fixed to the inner side of the outer wall portion without using a tacker or a protrusion.

Since the drop-off prevention rib is formed to be substantially parallel to the outer wall portion of the core material, it is not necessary to complicate a structure of a molding die for the core material. Further, since it is not necessary to form many engagement holes at the peripheral edge portion of the skin material, cost reduction can be achieved. Further, by mounting the resin band continuously to the inner surface of the peripheral edge portion, the skin material can be folded and fixed even at the corner portion without generating wrinkles. Thus, it can be manufactured even by a non-skilled person.

Further, as in claim 4, by forming the stopper wall with which the end portion of the resin band is contacted at the inner surface of the outer wall portion of the core material, the end portion of the resin band is not allowed to escape toward an end portion direction due to the elasticity, and therefore the resin band can be further firmly fixed.

DETAILED DESCRIPTION

Hereinafter, embodiments of the present invention are described.

Figure 1:
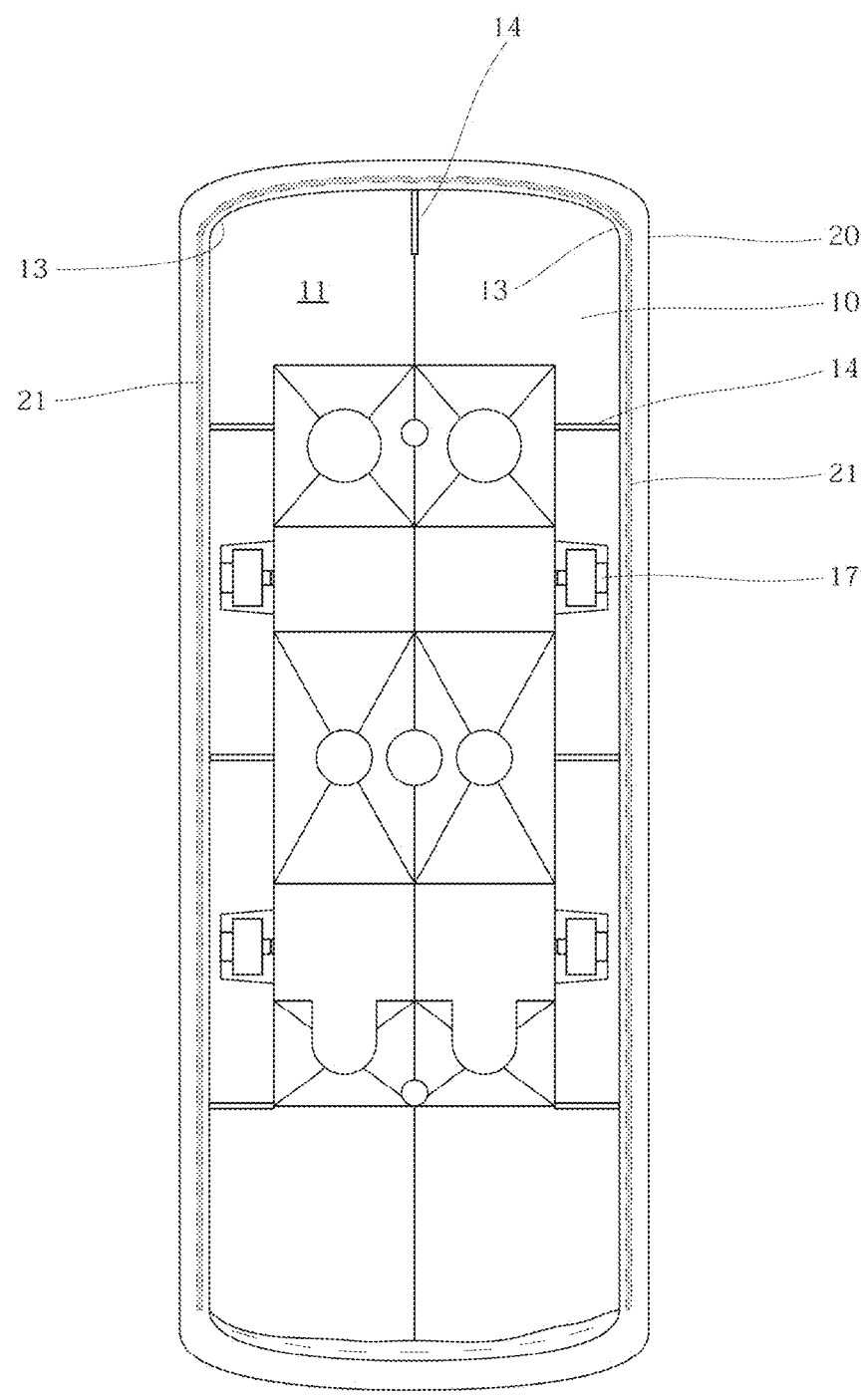
FIG. 1 is a view of an interior component seen from a rear surface according to an embodiment.

FIG. 1 is a front view of an interior component seen from a rear surface according to an embodiment, and 10 denotes a core material made of resin and 20 denotes a skin material arranged to cover a surface of the core material 10.

Figure 2:
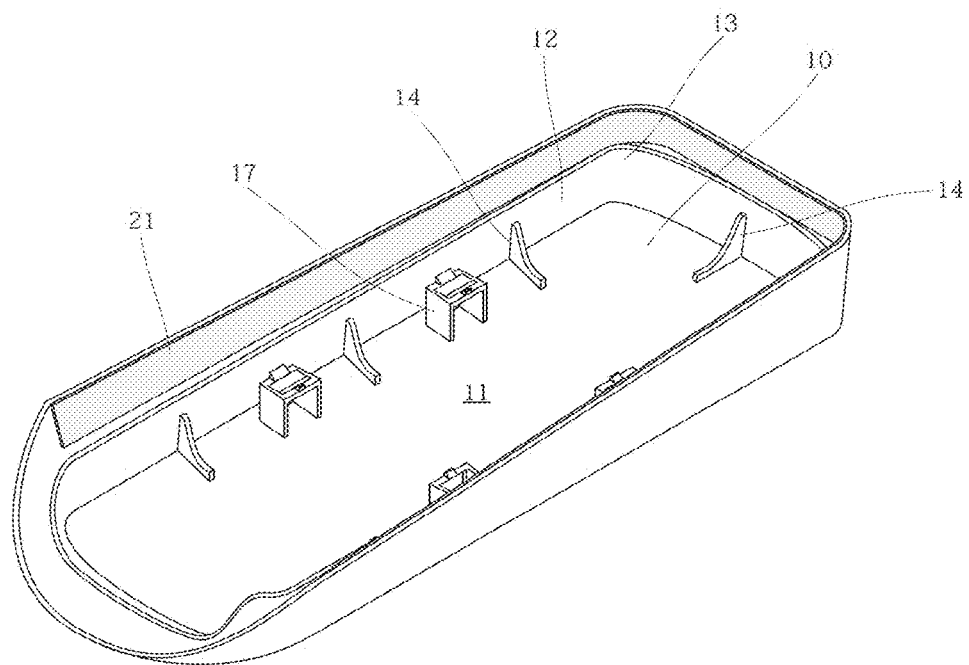
FIG. 2 is a perspective view illustrating a state before a peripheral edge portion of a skin material is folded.

As shown in FIG. 2, the core material 10 is provided with a top plate 11 and an outer wall portion 12 around the top plate 10. In the present embodiment, each of right and left sides of the outer wall portion 12 of the core material 10 is provided with a straight part, and each of upper and lower sides of the outer wall portion 12 in the figure is formed in a gentle arc shape. Further, each of four corner parts 13 has an R-shape (arc shape). A curvature radius thereof is preferably set to be 10 mm or more.

Figure 4:
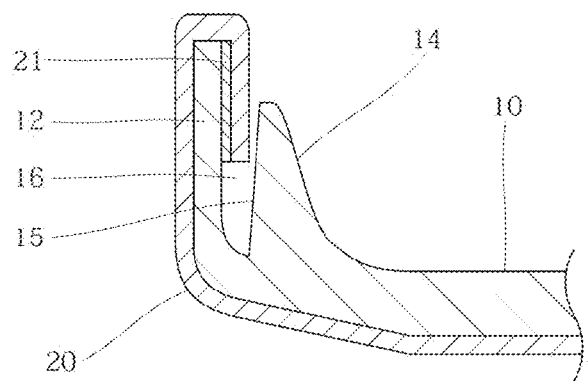
FIG. 4 is a cross-sectional view of a drop-off prevention rib.

A plurality of drop-off prevention ribs 14 is arranged adjacent to the inner surface of the outer wall portion 12 of the core material 10 so as to be formed integrally with the outer wall portion 12. As shown in FIG. 2 and FIG. 4, the drop-off prevention rib 14 is formed in a plate shape and provided with an end surface 15 substantially parallel to the outer wall portion 12 of the core material 10. A gap 16 into which a peripheral edge portion of the skin material 20 is inserted is formed between the outer wall portion 12 and an end surface 15 of the drop-off prevention rib 14. A dimension of the gap 16 is set in a range between 3 and 7 mm. In the present embodiment, the drop-off prevention rib 14 is formed at an inside of the three portions of the outer wall portion 12 arranged at the right, left and upper sides. The drop-off prevention rib 14 is formed substantially parallel to the outer wall portion 12 of the core material 10, and thereby it is not necessary to complicate a structure of a molding die for the core material 10.

Figure 5:
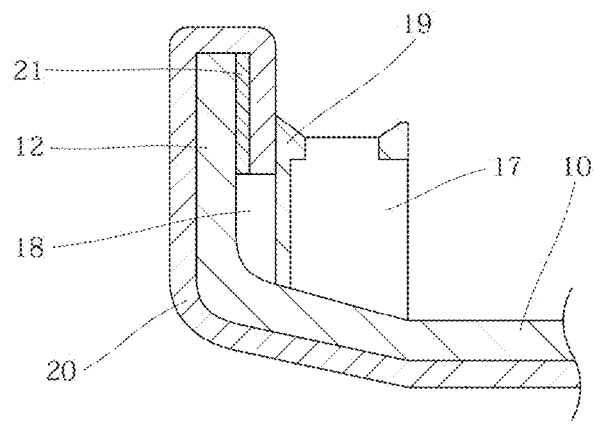
FIG. 5 is a cross-sectional view of a gate type drop-off prevention rib.
Figure 6A:
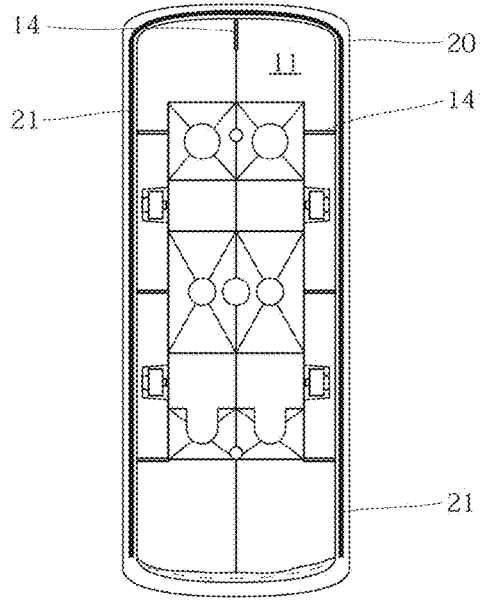
FIGS. 6(*a*) to 6(*d*) are views of an interior component seen from a rear surface according to another embodiment.
Figure 6B:
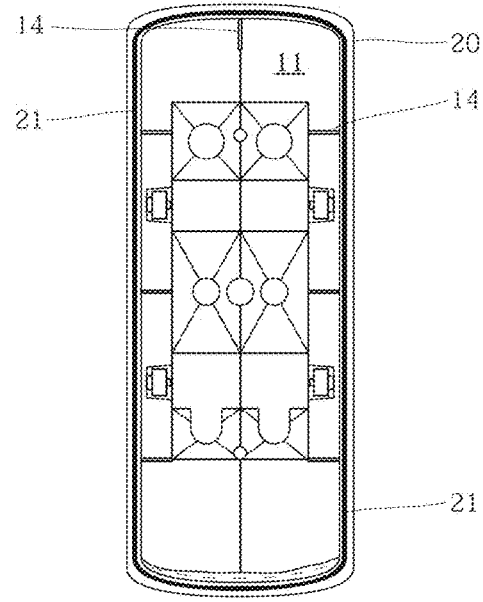
Figure 6C:
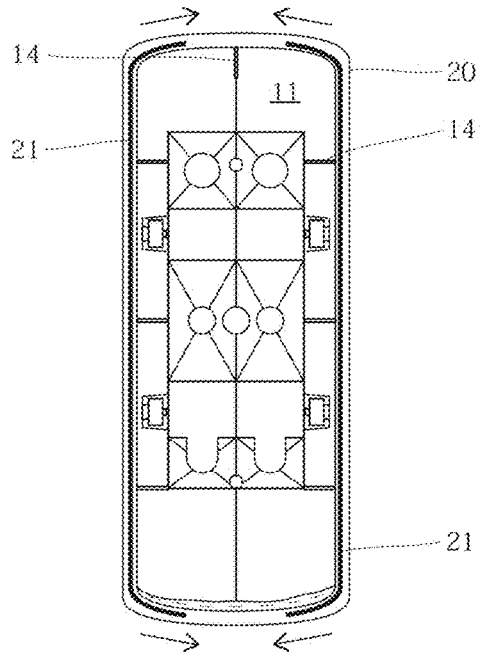
Figure 6D:
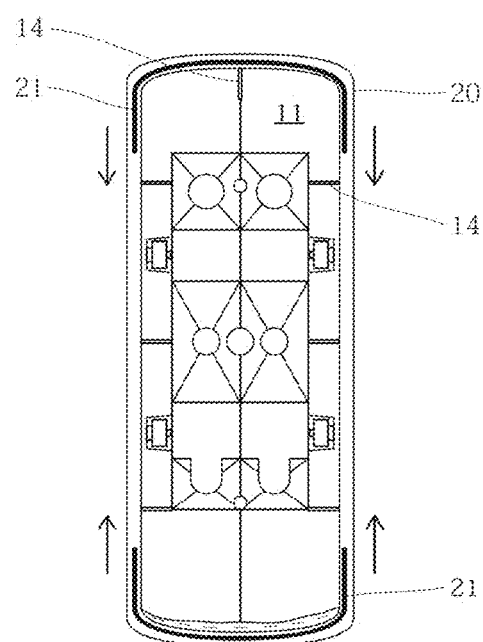

A gate type drop-off prevention member 17 as shown in FIG. 2 and FIG. 5 is arranged adjacent to the inner surface of the right and left portions of the outer wall portion 12 in addition to the drop-off prevention rib 14. The gate type drop-off prevention member 17 is formed to attach a rear lid (not shown); however the peripheral edge portion of the skin material 20 may be inserted into a gap 18 between the gate type drop-off prevention member 17 and the outer wall portion 12. A claw portion 19 is provided at the tip of the gate type drop-off prevention member 17.

The gate type drop-off prevention member 17 is formed to attach the lid for a rear surface in the present invention, and therefore the gate type drop-off prevention member 17 is not always necessary in the present invention; however the gate type drop-off prevention member 17 can be used together with the drop-off prevention rib 14 as a drop-off prevention member for a resin band 21 described below. Further, it is preferable that in the right and left straight parts of the outer wall portion 12, a gap between the gate type drop-off prevention members 17, or a gap between the drop-off prevention ribs 14 is made narrow to allow a plurality of the gate type drop-off prevention members 17 and the drop-off prevention ribs 14 to be disposed.

The skin material 20 is similar to a conventional one, and in the present embodiment, a skin material in which a urethane foam layer is formed on a rear surface of a skin layer is adopted, and the skin material is sewn to correspond to a shape of the core material 10. However, it is different from the conventional one and a flexible resin band 21 is mounted to an inner surface of a peripheral edge portion of the skin material 20. The resin band 21 is formed by a resin core material, which is commercially available, having a constant width and a thickness of substantially 0.5 to 2.0 mm. It is preferable that the width is substantially 5 to 15 mm.

The resin band 21 has flexibility and elasticity, and one surface of the resin band 20 is mounted to the peripheral edge portion of the skin material 20 by means of bonding, welding, or sewing. A mount position of the skin material 20 is a position folded into the inner side of the outer wall portion 12 of the core material 10 in the periphery edge portion of the skin material 20. As shown in FIG. 2, the resin band 21 is mounted continuously to at least two sides including the corner portion 13.

As shown in FIG. 2, the skin material 20 is arranged to cover the core material 10 from an outside of the top plate 11, and the peripheral edge portion of the skin material 20 is folded together with the resin band 21 and inserted into the gap between the outer wall portion 12 of the core material 10 and the drop-off prevention rib 14.

Figure 3:
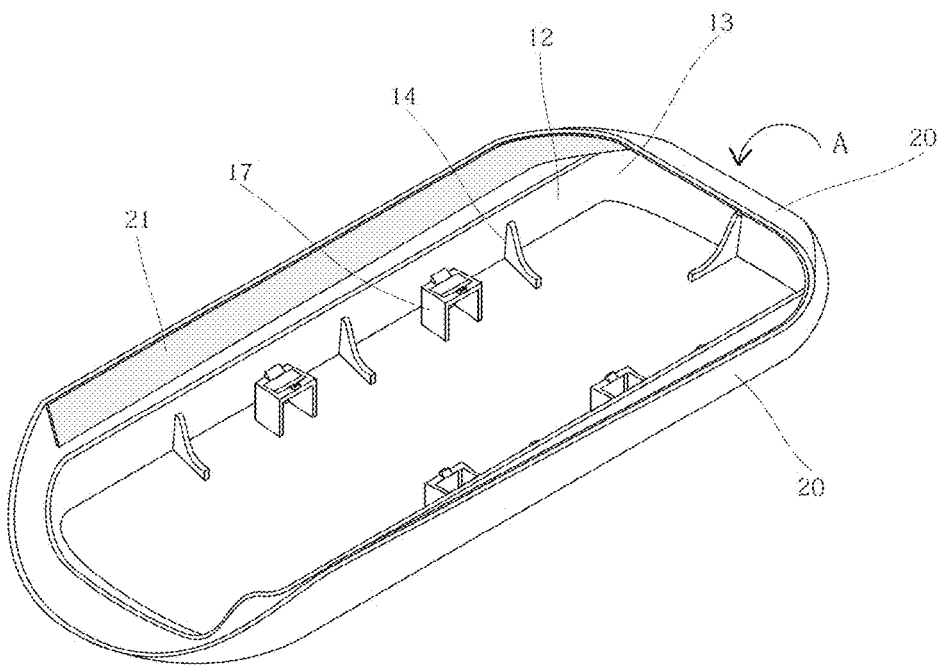
FIG. 3 is a perspective view illustrating a state in which the peripheral edge portion of the skin material is being folded.

The folding is started from the straight part as shown by A in FIG. 3, and at the corner portion 13, the resin band 21 is folded into the inside as shown in FIG. 3 while bending the resin band 21 by adding force to the resin band 21. At this time, when the resin band 21 is bent beyond the neutral point, the resin band 21 is folded into the inside by the elasticity thereof, and in association with that, the peripheral edge portion of the skin material 20 is also folded without generating wrinkles. Also at another corner portion 13 continuing this, similar folding is performed. In this way, by folding the peripheral edge portion of the skin material 20 together with the resin band 21 in the outer wall portion 12 including at least one corner portion 13, the resin band 21 is fitted with the inner surface of the outer wall portion 12 of the core material 10 by the elasticity thereof, and drop-off of the resin band 21 is prevented. Further, as shown in FIG. 4 and FIG. 5, by inserting the peripheral edge portion of the skin material 20 into the gap 16 between the outer wall portion 12 of the core material 10 and the drop-off prevention rib 14 and the gap 18 between the outer wall portion 12 and a gate type drop-off prevention member 17, the drop-off is further firmly prevented.

In this way, by folding the resin band 21 in the part including the corner portion 13, the resin band 21 is fitted with the inner surface of the outer wall portion 12 of the core material 10 by the elasticity thereof. However, since such an effect is less in the straight part, the peripheral edge portion of the skin material 20 is inserted together with the resin band 21 into the gap 16 between the outer wall portion 12 and the drop-off prevention rib 14 or the gap 18 between the gate type drop-off prevention member 17 and the outer wall portion 12 in order to prevent the drop-off. Thus, the peripheral edge portion of the skin material 20 is not dropped off from the gaps 16, 18.

In this way, the interior component according to the present invention has a structure in which the skin material 20 is fixed to the outer wall portion 12 of the core material 10 by using the rigidity and the elasticity of the flexible resin band 21 mounted to the inner surface of the peripheral edge portion of the skin material 20. Thus, the peripheral edge portion of the skin material can be firmly fixed to an inner side of the outer wall portion without using a tacker as in the conventional art. Further, since it is not necessary to form the protrusion on the outer wall portion 12 of the core material 10 or forming many engagement holes in the peripheral edge portion of the skin material 20 as in the conventional art, cost reduction can be achieved.

Further, since the resin band 21 is bent into the inner side by the elasticity thereof and the peripheral edge portion of the skin material 20 is folded without generating wrinkles, it can be manufactured even by a non-skilled person. Further, if the curvature radius of the corner portion 13 is small, the folding of the resin band 21 becomes difficult, and therefore the curvature radius is set to be 10 mm or more.

In the embodiment described above, as shown in FIG. 6(*a*), the peripheral edge portion of the skin material 20 to which the resin band 21 is mounted is folded and fixed across the three sides including the corner portion 13 of the core material 10. However, as shown in FIG. 6(*b*), the resin band 21 may be mounted to a whole periphery of the skin material 20. Further, as shown in FIGS. 6(*c*) and 6(*d*), the resin band 21 may be mounted to two sides including the corner portions 13. In this way, in the present invention, it is necessary to elastically fold the resin band 21 into the corner portion 13 having the R-shape of the core material 10.

At last, an embodiment of the invention according to claim 4 is described.

Figure 7:
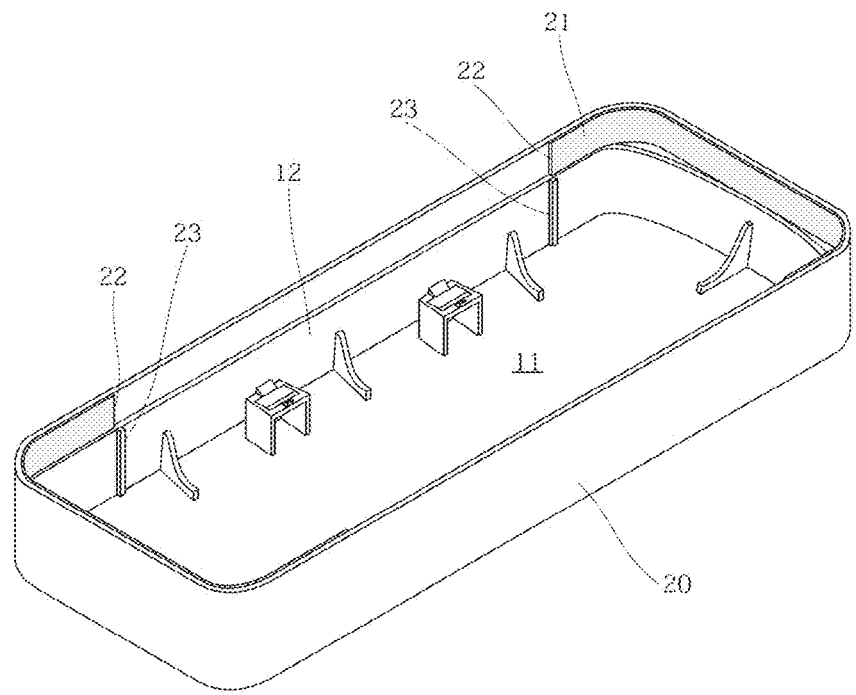
FIG. 7 is a perspective view illustrating an embodiment of claim 4 (before folding).
Figure 8:
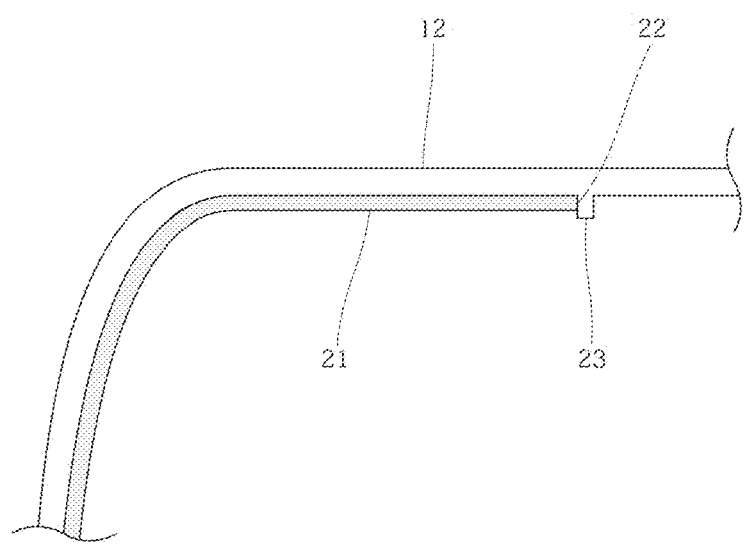
FIG. 8 is a plane view of a main part illustrating the embodiment of claim 4 (after folding).
Figure 9:
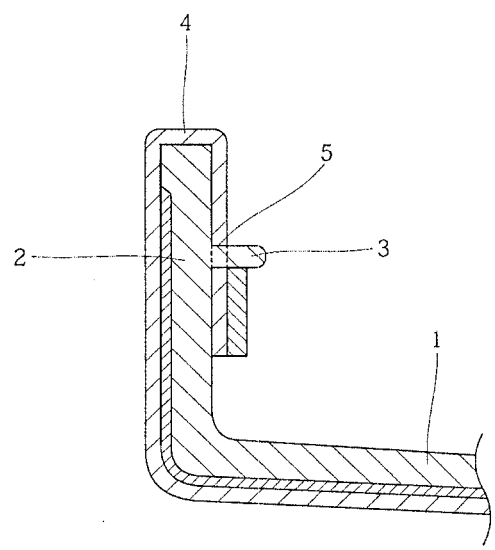
FIG. 9 is a cross-sectional view illustrating a conventional structure.

In a case in which the resin band 21 is divided as shown in FIGS. 6(*c*) and 6(*d*), an end portion 22 of the resin band 21 might escape in an end direction shown by arrows in FIGS. 6(*c*) and 6(*d*) by the elasticity of the resin band 21 because the end portion 22 of the resin band 21 is free. However, as shown in FIG. 7, by arranging a stopper wall 23 with which the end portion 22 of the resin band 21 is contacted at an inner surface of the outer wall portion 12 of the core material 10, the end portion 22 of the resin band 21 bent as shown in FIG. 8 is prevented from moving, and the resin band 21 can be fixed further firmly. The stopper wall 23 may be slightly protruded from the inner surface of the outer wall portion 12 of the core material 10.

REFERENCE SIGNS LIST

1 core material (conventional art)
2 outer wall portion
3 protrusion
4 skin material
5 engagement hole
10 core material (present invention)
11 top plate
12 outer wall portion
13 corner portion
14 drop-off prevention rib
15 end surface
16 gap
17 gate type drop-off prevention member
18 gap
19 claw portion
20 skin material
21 resin band
22 end portion
23 stopper wall

What is claimed is:

1. An interior component comprising:
   a core material; and
   a skin material arranged to cover a surface of the core material,
   wherein:
   the core material is provided with a top plate and an outer wall portion having an R-shape at a corner portion;
   a resin band is produced in advance as a resin core material, the resin band produced in advance is fixed to an inner surface of a peripheral edge portion of the skin material;
   the resin band produced in advance and the peripheral edge portion of the skin material are fitted to the outer wall portion of the core material by using reaction force generated when the resin band produced in advance is elastically folded into the corner portion.

2. The interior component according to claim 1, wherein the resin band produced in advance is formed by the resin core material having a constant width, and the resin band produced in advance is continuously mounted to the inner surface of the peripheral edge portion including the corner portion of the skin material.

3. The interior component according to claim 1, wherein the core material is provided with a plurality of drop-off prevention ribs arranged adjacent to the outer wall portion.

4. The interior component according to claim 1, wherein a stopper wall with which an end portion of the resin band produced in advance is contacted and arranged on an inner surface of the outer wall portion of the core material.

5. The interior component according to claim 2, wherein the core material is provided with a plurality of drop-off prevention ribs arranged adjacent to the outer wall portion.

\* \* \* \* \*